US009322640B2

(12) United States Patent
Koptyaev et al.

(10) Patent No.: US 9,322,640 B2
(45) Date of Patent: Apr. 26, 2016

(54) OPTICAL MEASURING SYSTEM AND METHOD OF MEASURING CRITICAL SIZE

(71) Applicant: SAMSUNG ELECTRONICS CO., LTD., Suwon-si (KR)

(72) Inventors: Sergey Nikolaevich Koptyaev, N.Tagil Sverdlovskoy oblasti (RU); Maxim Vladimirovich Ryabko, Dolgoprudniy (RU); Alexander Vyacheslavovich Shcherbakov, Moscow Oblast (RU); Alexey Dmitrievich Lantsov, Moscow Oblast (RU)

(73) Assignee: SAMSING ELECTRONICS CO., LTD., Suwon-si (KR)

( * ) Notice: Subject to any disclaimer, the term of this patent is extended or adjusted under 35 U.S.C. 154(b) by 325 days.

(21) Appl. No.: 13/961,305

(22) Filed: Aug. 7, 2013

(65) Prior Publication Data
US 2014/0043471 A1    Feb. 13, 2014

(30) Foreign Application Priority Data

Aug. 7, 2012 (RU) ................................. 2012133571
Jul. 2, 2013 (KR) ........................ 10-2013-0077295

(51) Int. Cl.
*G01B 11/02* (2006.01)
(52) U.S. Cl.
CPC ............ *G01B 11/02* (2013.01); *G01B 2210/56* (2013.01)
(58) Field of Classification Search
CPC ...................................................... G01B 11/02
See application file for complete search history.

(56) References Cited

U.S. PATENT DOCUMENTS

| 6,750,968 | B2 | 6/2004 | Sandusky | |
|---|---|---|---|---|
| 7,615,752 | B2 | 11/2009 | Raymond et al. | |
| 2004/0070771 | A1* | 4/2004 | Ausschnitt | G03F 7/70641 356/625 |
| 2005/0183056 | A1* | 8/2005 | Mimotogi | G03F 1/144 716/51 |
| 2007/0122056 | A1* | 5/2007 | Steinberg | G06K 9/346 382/275 |
| 2008/0278701 | A1* | 11/2008 | Choi | G03B 27/42 355/53 |
| 2009/0157360 | A1* | 6/2009 | Ye | G03F 7/705 703/2 |
| 2009/0295963 | A1* | 12/2009 | Bamford | G02B 21/367 348/302 |
| 2014/0160267 | A1* | 6/2014 | Kawakami | G02B 21/244 348/79 |

FOREIGN PATENT DOCUMENTS

KR      1020060060276 A    6/2006

* cited by examiner

*Primary Examiner* — Kate Luo
(74) *Attorney, Agent, or Firm* — Sughrue Mion, PLLC

(57) ABSTRACT

Optical measuring systems for measuring geometrical parameters of nano-objects and methods of measuring a critical size (CS) are provided. The optical method of measuring the CS includes selecting parameters of an optic scheme and an illumination condition; recording a set of nanostructure images corresponding to various wavelengths with various defocusing levels of scattered radiation; calculating a plurality of sets of images of a nanostructure with various defocusing levels, corresponding to various wavelengths of the scattered radiation with CS values within a known range; and comparing a set of measured images of the nanostructure with the sets of the calculated images and determining a best approximate value of the CS values.

20 Claims, 9 Drawing Sheets

OPTICAL MEASURING SYSTEM AND METHOD OF MEASURING CRITICAL SIZE

CROSS-REFERENCE TO RELATED APPLICATIONS

This application claims priority from Korean Patent Application No. 10-2013-0077295, filed on Jul. 2, 2013 in the Korean Intellectual Property Office, and Russian Patent Application No. 2012133571, filed on Aug. 7, 2012 in the Russian Patent Office, the disclosures of which are incorporated herein in their entirety by reference.

BACKGROUND

1. Field

Exemplary embodiments relate to measurement technology, and more particularly, to optical measuring systems for measuring the geometrical parameters of nano-objects and methods of measuring a critical size (CS).

2. Description of the Related Art

In the current production of semiconductor chips, achievements in microlithography have resulted in the trend to a reduction of the critical size (CS) of articles. Herein, the term "critical size" means a characteristic size of a nano-structure, which size is of a certain interest and is equal to some tens of nanometers. At present, the minimum CS of the nano-structure is about 30 nanometers and it is anticipated that in the future, the minimum CS may be reduced to about 20 nanometers.

The mass production of semiconductor structures having such small CS requires more strict standards of precision and reliabilities of the measuring equipment, and also requires improvement in the speed and cost of a measuring process. Thus, the existing measuring methods based on use of the scanning electron microscope (SEM) and an atomic-powered microscope (APM) are too slow and expensive, especially at a stage of rejecting chips with known topologies of which characteristic sizes of the structure differ just slightly from prescribed sizes. For such measuring, various optical methods have been developed based on an ellipsometry technique (see "Handbook of Ellipsometry", Harland G. Tompkins, Eugene A. Irene) and scatterometry (see Petre Catalin Logofatu et. al., Rom. Journ. Phys., Vol. 55, Nos. 3-4, P. 376-385, Bucharest, 2010), in particular, a widely known method "optical critical dimension" (OCD) (see Ray J. Hoobler and Ebru Apak, Proceedings of SPIE, Vol. 5256, 23rd Annual BACUS Symposium on Photomask Technology) which allows to distinguish a CS of a semiconductor structure smaller than a Rayleigh resolution limit.

Each existing optical analysis method has both advantages and drawbacks.

The OCD method is based on the dependence of the reflectivity factor of a subundular structure on the CS, on the wavelength and the sight angle of the incident radiation. Generally, two variants of application of the OCD method are used. A first variant is based on, at the fixed wavelength of the incident radiation, the dependence of the reflectivity factor on the angle of sight (scanning by angle). A second variant is based on, at the fixed angle of sight of the radiation, the dependences of the reflectivity factor on the wavelength (scanning by wavelength). In practice, the second variant measures the spectrum of the incident and reflected radiation, and, based on the results of these measurements, the dependence is determined between the reflectivity factor and the wavelength. The measured dependence is compared with the calculated dependences determined at various values of the CS. The best coincidence of the measured and calculated curve gives a required value of the CS.

The OCD method is commonly used in a semiconductor production. However it is not applicable to carry out the analysis of non-periodic (non-cycle) structures, structures with small set of periods (cycles) or structures consisting of one or several isolated objects.

The method of "optical microscopy scanning through focus" (TSOM, Through-focus Scanning Optical Microscopy) (see Attota, R., Silver, R. M., and Barnes, B. M., "Optical through-focus technique that differentiates small changes in line width, line height, and sidewall angle for CD, overlay, and defect metrology applications," Proc. SPIE 6922, 69220E-1-13, 2008), based on the analysis of low-contrast (defocused) images of an examined object generated by means of a microscope at scanning an object along an optical axis, enables analyzing the non-cycle and isolated objects. In the framework of TSOM, a mechanical scanning system, which ensures shifting the examined object along the focus with precision of some tens of nanometers, is one of core elements and, at the same time, it is the most vulnerable element, in the sense of reliability, of the TSOM measuring installation. Requirements for minimization of a necessary scanning step and for object positioning accuracy along the focus increase at a reduction of the characteristic sizes of the object, that, in case of vibrations, may reduce precision of measuring and reliability of all measuring systems as a whole. Further, the mechanical scanning method restricts the measuring quickness which is important in a set of practically important measuring problems of the semiconductor production. In this connection, the inspection methods which do not require mechanical scanning of a sample or of an individual element of the measuring system possess essential advantage.

SUMMARY

Exemplary embodiments provide an optical measuring system and a method of measuring the critical size of a nano-structure, based on processing defocused images without mechanical scanning of an examined object along a focus, which approach allows measuring a wide class of objects, including non-cycle ones.

According to an aspect of an exemplary embodiment, there is provided an optical measuring system of measuring the critical size of a nanostructure, the optical measuring system including: an illumination module configured to illuminate a sample with the nanostructure that is an examined object; an optical image generating module configured to generate an optical image of the nanostructure; a defocusing module configured to defocus the optical image; a calculation module configured to calculate a set of images with various defocusing levels; an adjusting and monitoring module configured to adjust and monitor parameters of an optic scheme and illumination conditions with respect to the set of images with various defocusing levels, and transmit, to the calculation module, the parameters of the optic scheme and the illumination conditions; a recording module configured to record the set of images with various defocusing levels; and a comparison module configured to compare the recorded and defocused images with pre-calculated and defocused images.

Various embodiments of the defocusing module configured to defocus with the defocusing level depending on the radiation wavelength differ in the range width of a spectral range (band), wherein the wavelength of the dispersed radiation may be changed to ensure a required defocusing range. Embodiments of the recording module configured to record images with various defocusing levels, wherein the module is based on the use of a radiation source with variable wavelengths and with a spatial spectral resolution.

In an exemplary embodiment of the optical measuring system, the defocusing module may include two identical parallel diffraction gratings and a mirror, which may allow to set an optical propagation difference depending on the wavelength.

In another exemplary embodiment of the optical measuring system, a function of the defocusing module may be performed by a pipe lens of the optical image generating module due to a chromatic aberration phenomenon.

In another exemplary embodiment of the optical measuring system, a function of the defocusing module may be performed by a lens of the optical image generating module due to the chromatic aberration phenomenon.

In an exemplary embodiment of the optical measuring system, the recording module may serially record the defocused images of the nanostructure that is the examined object at a wavelength adjusting, and may include a detector and a light source with an adjustable wavelength. The detector may be a CCD detector, a CCD/CMOS detector, or a well known image sensor.

In an exemplary embodiment of the optical measuring system, the recording module of recording defocused images may simultaneously record defocused images of the nanostructure that is the examined object by employing a spatial spectral resolution within the wavelength band (range) of a light source, and include a detector, a dispersive device, and a wideband spectrum light source. The detector may be a CCD detector, a CCD/CMOS detector, or a well-known image sensor.

According to another aspect of another exemplary embodiment, there is provided a method of measuring the critical size (CS) of a nanostructure without mechanical scanning, the method including: selecting parameters of an optic scheme and an illumination condition; recording a set of nanostructure images corresponding to various wavelengths with various defocusing levels of scattered radiation; calculating a plurality of sets of images of a nanostructure with various defocusing levels, corresponding to various wavelengths of the scattered radiation with critical size (CS) values within a known range; and comparing a set of measured images of the nanostructure with the sets of the calculated images and determining a best approximate value of the CS values.

In case where a set of the measured images and any of the calculated sets of images coincide at a given precision rate, the corresponding best approximate value of the CS values is output (displayed) by the measuring system via a user interface as a required value. In case where the coincidence of the measured and the calculated sequences of images is not achieved at the required precision, a new narrower range of a CS change is determined and last two operations are iterated till the required precision rate is reached. Thus, a selection of the CS value in the module of comparing the measured images of the nanostructure with the calculated images may occur in various ways. In a preferred embodiment of the method of the present invention, a method of optimizing and a method of calculating the library of images are considered. In the optimization method, the best estimation of the CS is established by simultaneous minimization of absolute values of differences of the corresponding images from the measured set and the calculated set. In the method of calculating the library of images, the set of the measured images is sequentially compared to the sets of the pre-calculated images, provided that the CS value varies within a known range of values. As a result of execution of the said sequence of operations constituting the essence of the measuring method according to the embodiments of the present invention, the best estimate of the measured CS value of the nanostructure is determined.

BRIEF DESCRIPTION OF THE DRAWINGS

The above and/or other aspects will become apparent and more readily appreciated from the following description of the embodiments, taken in conjunction with the accompanying drawings of which.

DETAILED DESCRIPTION

Figure 1:
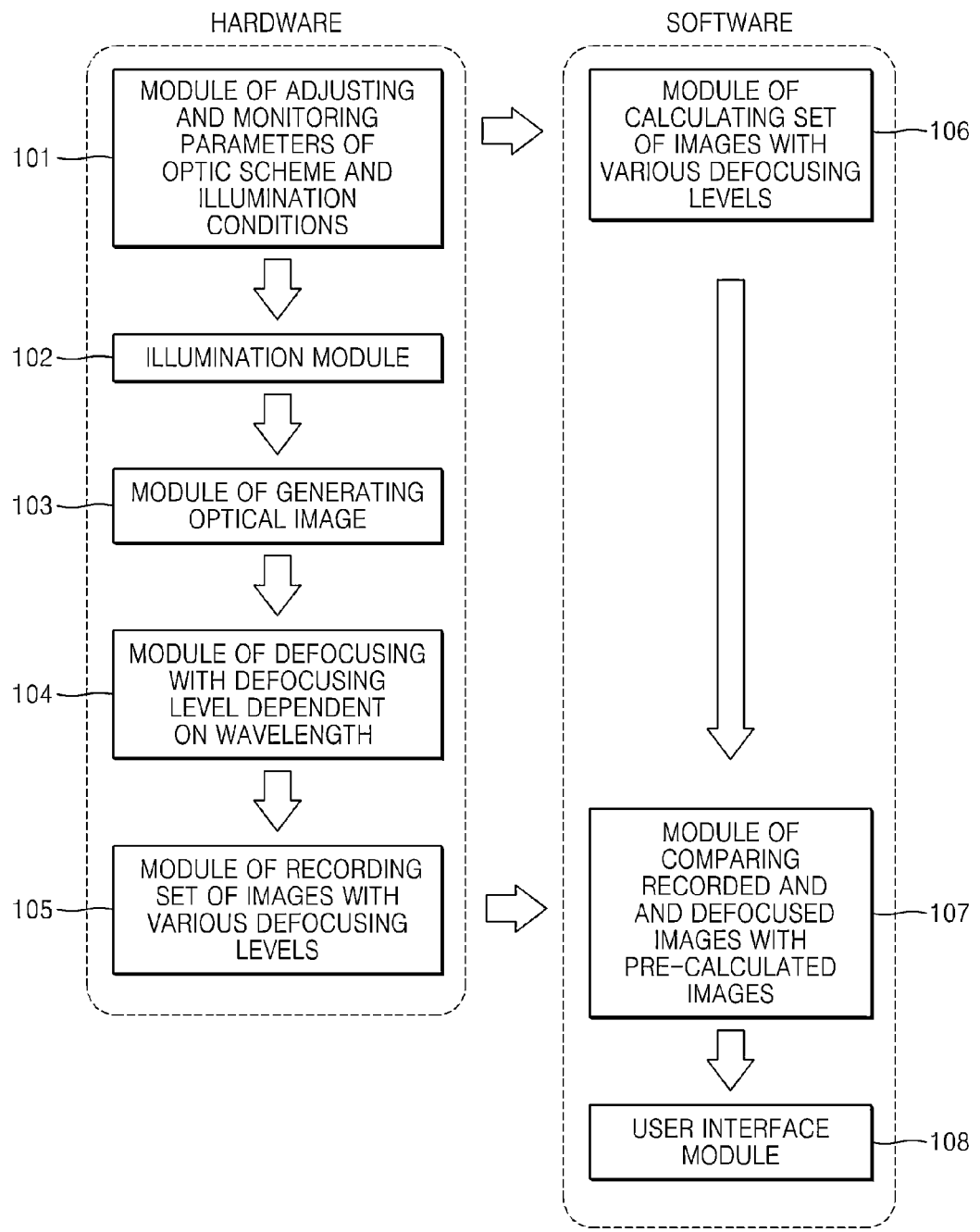
FIG. 1 shows a configuration of basic functional modules included in an optical measuring system for measuring a critical size based on changing a wavelength of the scattered radiation and defocusing of an optical image of a nanostructure, according to an exemplary embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

The term "nanostructure" as used herein should be understood as a structure where, at least, one of the characteristic sizes is equal to some tens nanometers, that is, of which value is below the Rayleigh resolution limit for optical systems in the visible range of the wavelengths.

The technical result of the exemplary embodiments is achieved due to the development of the measuring system and the measuring method, on the basis of an optical microscope, where the effect of a necessary defocusing level of an object image is ensured by a change (adjustment) of a wavelength of the scattered radiation on the object. The term "defocusing level" should be understood as a distance A which is necessary for shifting an object along the focus to generate its image non-distorted by the defocusing aberration.

The exemplary embodiments are implemented on the basis of an optical microscope utilizing Köhler illumination in a mode of recording the radiation reflected from a sample by the light field method. The TSOM method is used as a prototype of the exemplary embodiments.

FIG. 1 shows a configuration of in an optical measuring system for measuring a critical size based on changing a wavelength of the scattered radiation and defocusing of an optical image of a nanostructure, according to an exemplary embodiment. Hardware modules of the optical measuring system may include an adjusting and monitoring module 101, an illumination module 102, an optical image generating module 103, a defocusing module 104, and a recording module 105. Software modules of the optical measuring system may include calculation module 106, a comparison module 107, and a user interface module 108. The modules 101-108 will be described in detail below.

Figure 2:
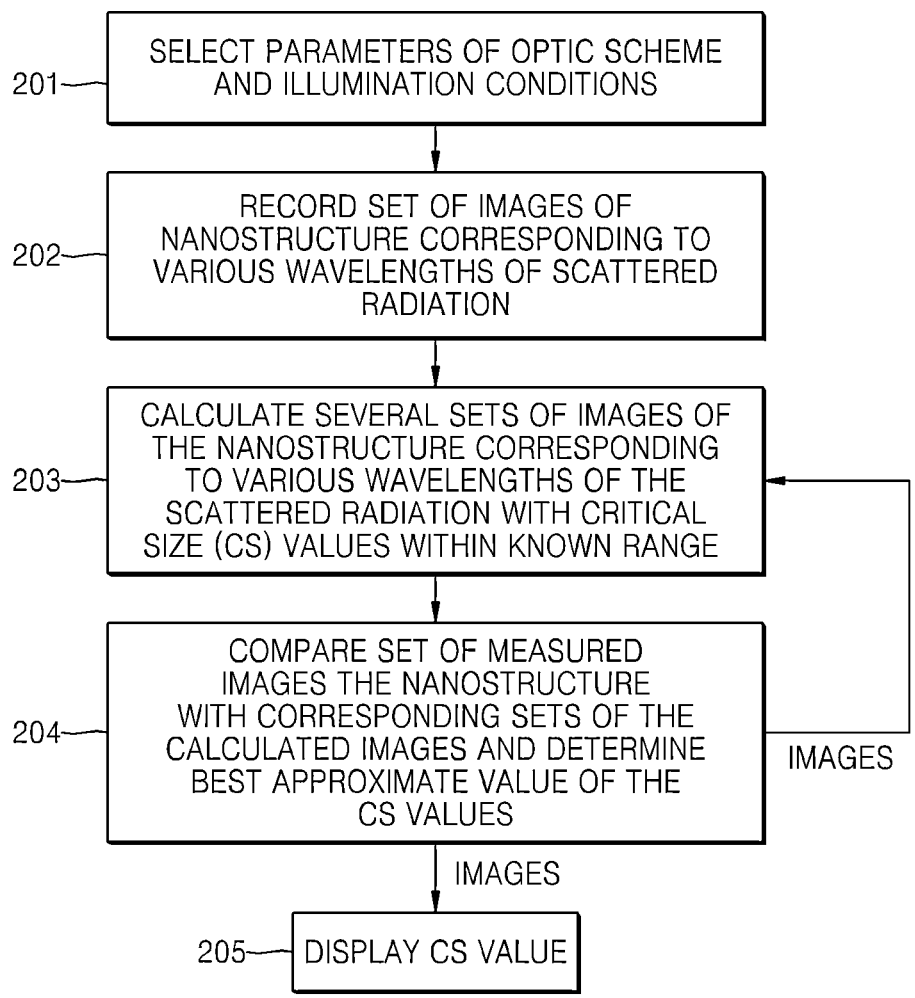
FIG. 2 is a flowchart of measuring a critical size included in an optical measuring method of measuring the critical size, based on changing a wavelength of the scattered radiation and defocusing of an optical image of a nanostructure, according to an exemplary embodiment.

FIG. 2 is a flowchart of measuring a critical size (CS) included in an optical measuring method of measuring the critical size, based on changing a wavelength of the scattered radiation and defocusing of an optical image of a nanostructure, according to an exemplary embodiment. As shown in FIG. 2, the method of measuring the CS of a nanostructure may include: selecting parameters of an optic scheme and an illumination condition (201); recording a set (number) of nanostructure images, corresponding to various wavelengths with various defocusing levels of scattered radiation (202); calculating several sets of images of a nanostructure with various defocusing levels, corresponding to various wavelengths of the scattered radiation with CS values within a known range (203); comparing a set of measured images of the nanostructure with the corresponding sets of the calculated images and determining the best approximate value of the CS values (204) and displaying the best approximate value of the CS values (205). The operations 201-205 will be described in detail below.

Referring to FIGS. 3, 5, 6, 7, and 8, an optical measuring system according to exemplary embodiments includes the illumination module 102, an optical image generating module 103, a defocusing module 10 (corresponding to defocusing module 104 of FIG. 1), and the recording module 105. Although not shown in FIGS. 3, 5, 6, 7, and 8, the optical measuring system may further include the adjusting and monitoring module 101 configured to adjust and monitor parameters of an optic scheme and illumination conditions, the comparison module 107, and a program module such as the user interface module 108.

As shown in FIGS. 3, 5, 6, 7, and 8, the illumination module 102 includes a light source 1, an illumination optical system 2, and a lens 4, and ensures illumination of a sample 5 according to Köhler with a chosen numerical aperture. The light source 1 may be a light source which is adjustable within a selected range of wavelength $\lambda 1 < \ldots < \lambda i < \ldots < \lambda N$ or may be a light source which does not allow adjustment of the wavelength and has a spectrum width $\Delta\lambda = \lambda N - \lambda 1$.

The optical image generating module 103 includes the lens 4, a beam splitter 3, and a pipe lens 6.

Figure 3:
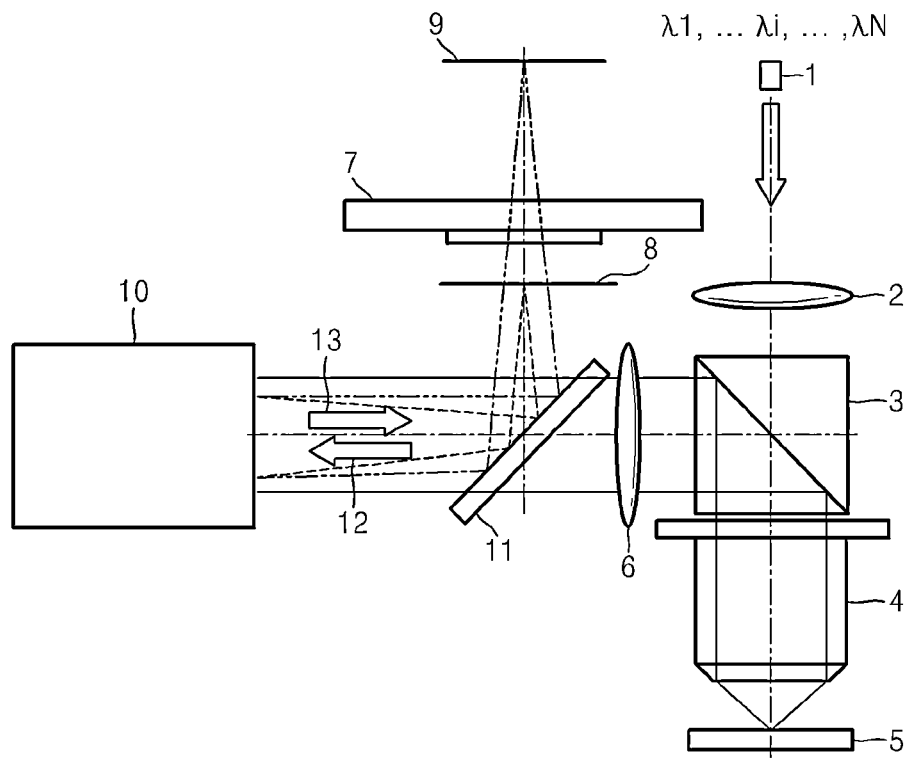
FIG. 3 shows an optic scheme of an optical measuring system in which a module of recording defocused images by using a radiation source with an adjustable wavelength is implemented, according to an exemplary embodiment.

The defocusing module 10 performs defocusing of which level depends on the wavelength. Together with the defocusing module 10, a splitter 11 that separates directions of an incoming beam 12 (to the defocusing module 10) and an outgoing beam 13 (from the defocusing module 10) may be used as shown in FIG. 3.

Figure 6:
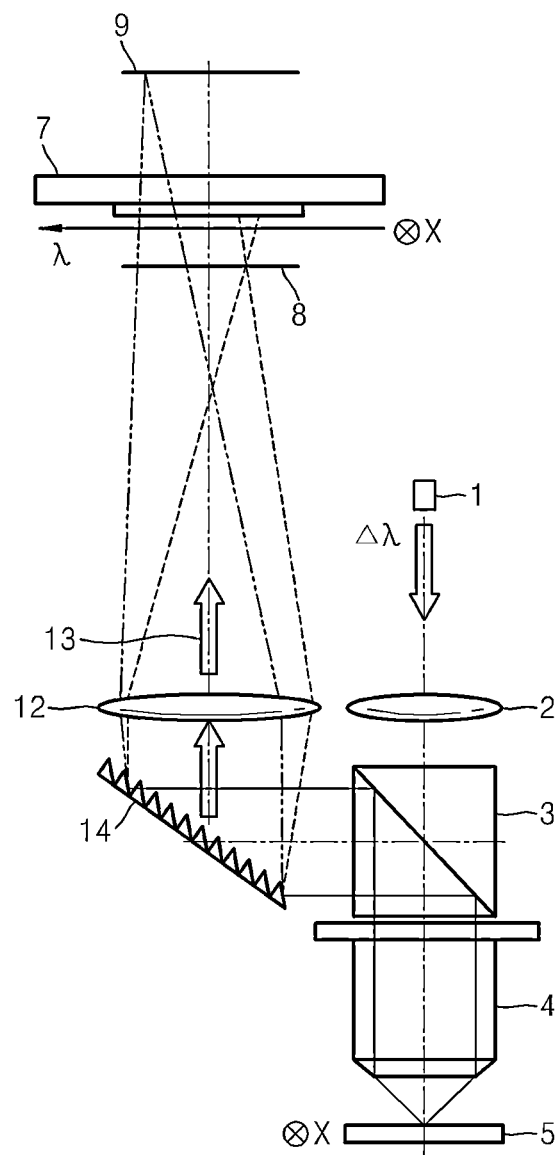
FIG. 6 shows an optic scheme of an optical measuring system in which a module of ensuring defocusing by changing a wavelength by using the chromatic aberration phenomenon in a pipe lens and a module of recording defocused images by using a spatial spectral resolution, according to an exemplary embodiment.
Figure 7:
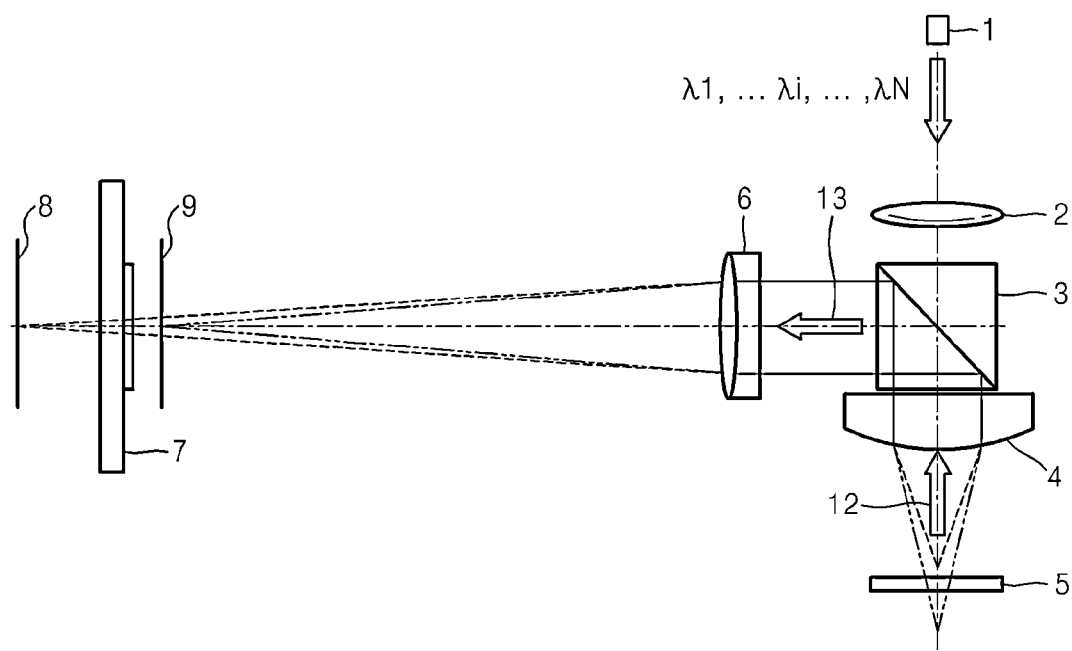
FIG. 7 shows an optic scheme of an optical measuring system in which a module of ensuring defocusing by changing a wavelength by using the chromatic aberration phenomenon in a lens and a module of recording defocused images by using a radiation source capable of the wavelength adjusting are implemented, according to an exemplary embodiment.
Figure 8:
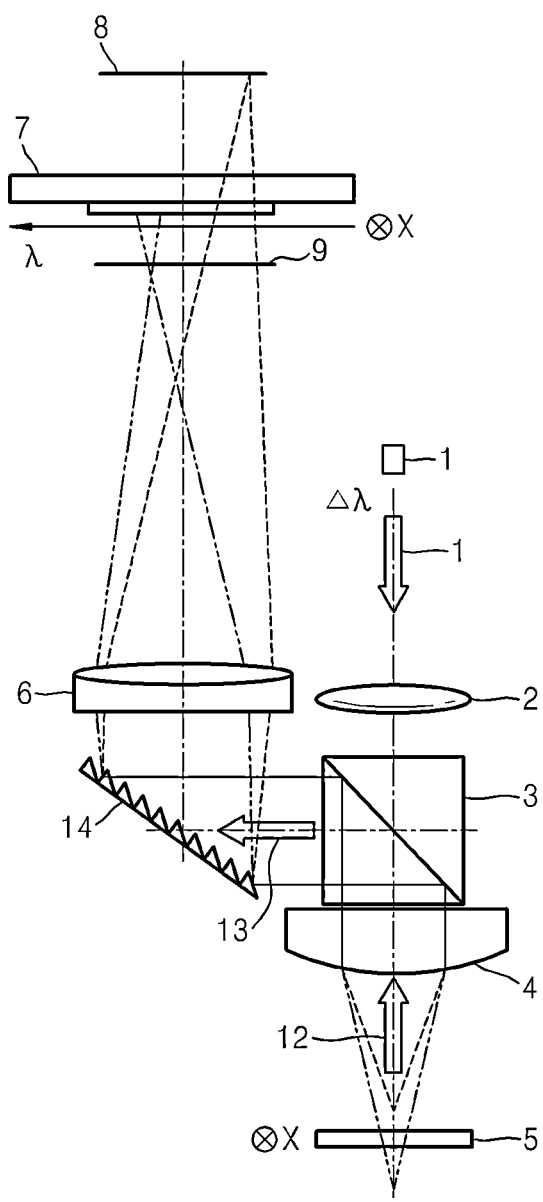
FIG. 8 shows an optic scheme of an optical measuring system in which a module of ensuring defocusing by changing a wavelength by using the chromatic aberration phenomenon in a lens and a module of recording defocused images by using a spatial spectral resolution, according to an exemplary embodiment.

The recoding module 105 is configured to record a set of images with various defocusing levels, and includes a detector 7 and the light source 1 in a case of using the light source 1 with adjustable wavelength $\lambda 1 < \ldots < \lambda i < \ldots < \lambda N$ (see FIGS. 3, 5, and 7) or includes the detector 7 and a dispersive device 14 in a case of using a light source with a spectrum range $\Delta\lambda$, and may be implemented as a module securing the spatial spectral resolution (FIGS. 6 and 8). The detector 7 may be a CCD detector, a CMOS detector, or a well known image sensor.

Key parameters of the optic scheme that determine requirements to illuminate and record images of the sample 5 having a nanostructure that is an examined object include at least one of a spatial-frequency and temporal spectrum of the illuminating radiation; the polarization vector direction; and a numerical aperture (NA) of the lens 4, a level (degree) of defocusing, and its dependence on the wavelength that are implemented by a design of the defocusing module 10.

The optimum parameters of the optic scheme in each individual measurement depend on a topology and critical size of the nanostructure and may be selected within the following ranges of value changes:

A temporal spectrum of the illuminating radiation may be within a wavelength range of $\lambda = 300\text{-}800$ nanometer A spatial spectrum of the illuminating radiation may comply with the condition $0.1 < (NAill/NA) < 1$, where NAill denotes an illumination numerical aperture, and NA denotes the numerical aperture of the lens 4.

The numerical aperture NA of the lens 4 may be determined within a range of $0.2 < NA < 0.9$.

The level of defocusing A may satisfy the condition: $0 < \Delta < 5 * \lambda / (NA)^2$, where $\lambda$ denotes a medial wavelength of the illuminating radiation, and NA denotes the numerical aperture of the lens 4.

The adjusting and monitoring module 101 is configured to adjust and monitor the parameters of the optic scheme and the illumination conditions and may activate at least some measuring devices including: a photodiode, a spectrometer, a detector; and control elements capable of changing the spatial spectrum of the illuminating radiation, the polarization vector direction and the wavelength of the radiation source to enable defocusing.

Further, the adjusting and monitoring module 101 is configured to transmit the parameters of the optic scheme and the illumination conditions to the calculation module 106 for calculating a set of images with various levels of defocusing.

Dependence of the defocusing level on the radiation wavelength may be implemented by the design of the defocusing module 10. It may be possible to ensure a change range of the level of defocusing Δ required in a measuring process while changing the wavelength of the illumination on the basis of the chromatic aberration phenomenon in the pipe lens 6 (see FIGS. 5 and 6). If a glass refraction index of the lens 6 depends on the wavelength, the following expression 1 may be applied (see M. Born and E. Wolf, Principles of Optics, 6th ed., Pergamon, Oxford, UK, 1989) for a focal distance F of the pipe lens 6:

$$\frac{\delta F}{F} + \frac{\delta n}{n-1} = 0 \qquad \text{[Expression 1]}$$

In expression 1, δn denotes a change of the glass refraction index, and SF denotes a change of the focal distance F of the pipe lens 6 at a maximal admissible change of the wavelength of the illuminating radiation Δλ for the selected light source 1. Thus, the shortest wavelengths may generate an object image in a plane 8, and the longest wavelengths may generate a rather sharp image of the object on another plane 9. In the absence of chromatic aberrations of the lens 4, the maximal level of defocusing Δ may satisfy the following expression 2:

$$\Delta \sim \frac{\delta F \cdot f^2}{F^2} \sim \frac{1}{M} \cdot f \cdot \frac{\delta n}{n-1} \qquad \text{[Expression 2]}$$

In expression 2, f denotes the focal distance of the lens 4, and M=F/f denotes magnification of the system including the "lens 4/pipe lens 6". In this case, a function of defocusing module 10 ensuring defocusing of which level depends on the wavelength is performed by the pipe lens 6.

It is possible to augment the maximum defocusing level without augmenting a width of the spectrum range of the change of the wavelengths Δλ of the illuminating source, by linking the chromatic aberration phenomenon with lenses (see FIGS. 7 and 8). In the absence of chromatic aberrations in the pipe lens 4, a peak level of defocusing Δ in this case may satisfy the following expression 3:

$$\Delta \sim \delta f \sim f \cdot \frac{\delta n}{n-1} \qquad \text{[Expression 3]}$$

In expression 3, f denotes the focal distance of the lens 4. Thus, in an optical system scheme according to an embodiment, a function of the defocusing module 10 ensuring defocusing which level depends on the wavelength is performed by the lens 4. Thus, a peak of the defocusing level Δ is M times more than a case where the defocusing module 10 is implemented in the shape of the pipe lens 6 possessing chromatic aberrations, with respect to the change in the wavelength of the radiant source on Δλ.

Figure 9:
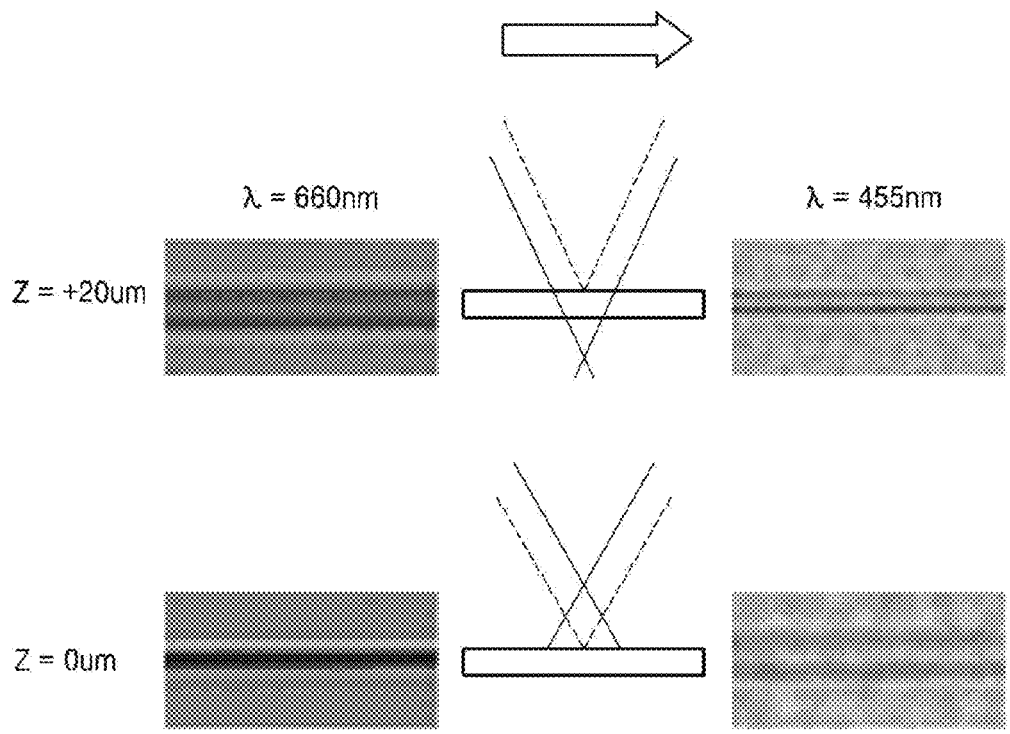
FIG. 9 shows an example of images of a groove with a width of about 500 nm in a silicon layer showing a change in a defocusing level when a wavelength of the scattered radiation is changed by using the chromatic aberration phenomenon in a pipe lens.

FIG. 9 shows an example of images of a superficial groove in a silicon layer with a width of about 500 nm, illuminated and generated by the radiation with wavelengths of about 660 nm and about 455 nm. The images are generated in two positions of the groove along a focus line: 0 um and +20 um.

As easily shown in the drawing, the images of the groove generated at one position along the focus line have different levels of defocusing in different wavelengths. In the position "0 um" a lower defocusing level may be shown in the image with the wavelength λ=455 nm, and in the position "+20 um" a lower defocusing level may be shown in the image of the groove generated at the wavelength λ=660 nm. In this case, defocusing which level depends on the wavelength is provided by the pipe lens 6 with the focal distance F~250 mm. The parameters of illumination and recording have been selected as: NA=0.25, NAill/NA~0.1.

Implementing the peak level of defocusing Δ necessary for measurement when the wavelength is changed within a narrow range of wavelengths Δλ may prosper from the point of view of lowering the requirements for a light source. For example, typical laser diodes with a visible range of the wavelength have a range of adjusting the wavelength λλ~615 nm. For the majority of glasses the dispersion factor dn/dλ may be expressed as ~0.01-0.03 μm$^{-1}$. Thus, the factor $$\frac{\delta n}{n-1}$$

limitedly appears and makes ~(1-3)·10$^{-4}$. In this case, it is very problematic to implement the maximal defocusing range 0<Δ<5*λ/(NA)$^2$. For example, for a lens with the numerical aperture NA=0.9, the maximal defocusing range may be Δ~0-3 μm (λ=0.5 μm), by using both the chromatic aberration phenomenon in the pipe lens 6 and the chromatic aberration phenomenon in the lens 4 for defocusing. In this case, the configuration of FIG. 4 may be used as an alternative example of the defocusing module 10 ensuring defocusing of which level depends on the wavelength.

Figure 4:
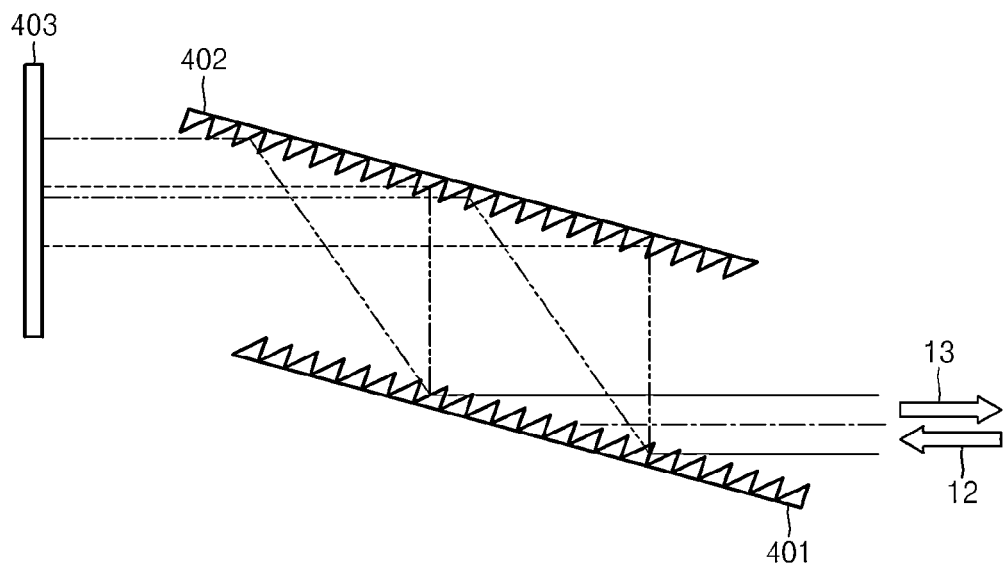
FIG. 4 shows an optic scheme of an optical measuring system in which a module of ensuring defocusing of which level depends on a wavelength is implemented, according to an exemplary embodiment.
Figure 5:
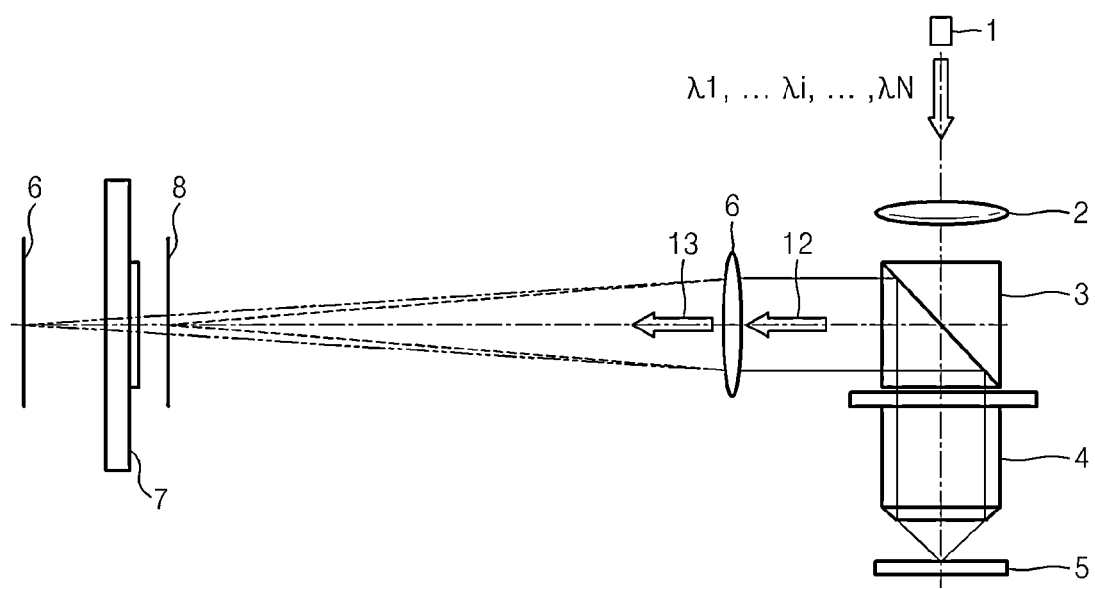
FIG. 5 shows an optic scheme of an optical measuring system in which a module of ensuring defocusing by changing a wavelength by using the chromatic aberration phenomenon in a pipe lens and a module of recording defocused images by using a radiation source capable of the wavelength adjusting are implemented, according to an exemplary embodiment.

As shown in FIG. 4, double diffraction gratings 401 and 402 that are arranged in parallel with and identical to each other constitute a double grating system. A collimated light beam 12 is directed, at a sliding angle, to the diffraction grating 401, after reflected from the diffraction grating 401, is directed to the diffraction grating 402 parallel with and identical to the diffraction grating 401, is incident on a mirror 403, after reflected from the mirror 403, and goes out in a direction of the light beam 13 collinear to the direction of beam 12 from the optical scheme by going backwards through the entire path in the opposite direction. In view of the dispersion of the diffraction gratings, the dispersion is determined by a period of the diffraction gratings 401 and 402. Short waves and long waves travel different optical paths and go out of the double grating system with an optical propagation difference depending on the parameters of the diffraction gratings 401 and 402 and a distance between the diffraction gratings 401 and 402. If the configuration of FIG. 4 is applied to the defocusing module 10 in the optic configuration shown in FIG. 3, the necessary range of defocusing Δ may be achieved, when the wavelength of the light source 1 even in the narrow range AA is changed.

Thus, to record one defocused image of the nanostructure in selected conditions of illuminating the sample 5, an adjustment of the wavelength of the radiation source and a capture of an image by the detector 7 are performed. The iteration of these operations may ensure serial recording of a set of defocused images of the sample that is an examined object. Thus, a necessary level of defocusing each image may be automatically ensured by a particular design of the module 10, and the mechanical shifting of the sample 5 along the focus line is not required.

Figure 10A:
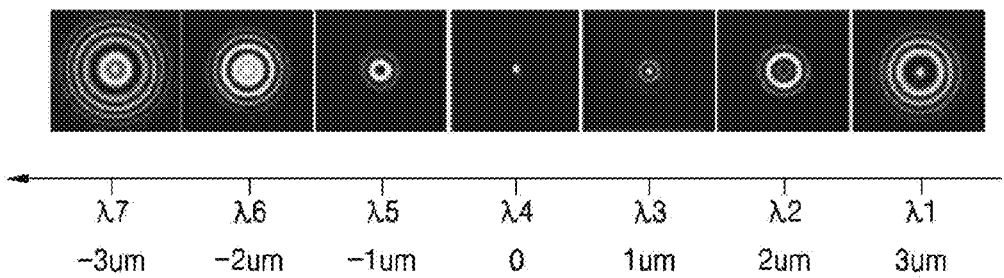
FIG. 10A shows an example of a set of images of a point radiation source with various defocusing levels recorded in an optical measuring system using a radiation source capable of the wavelength adjusting, according to an exemplary embodiment.
Figure 10B:
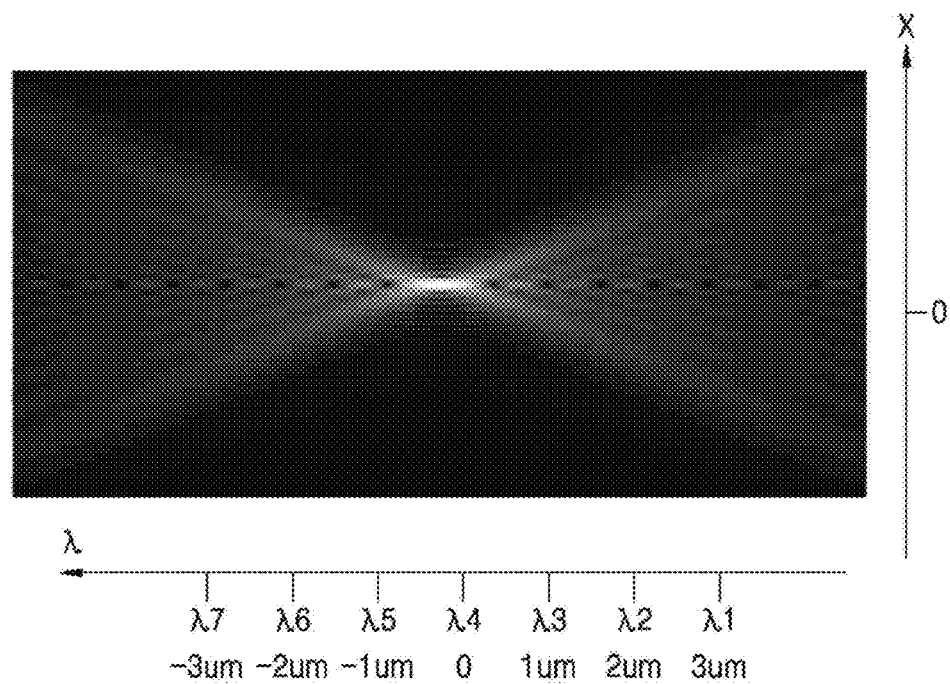
FIG. 10B shows an example of a set of images of a point radiation source with various defocusing levels recorded in an optical measuring system using the spatial spectral resolution, according to an exemplary embodiment.

To make requirements for an illuminating radiation source less severe by refraining from the wavelength adjustment, the configurations shown on FIGS. 6 and 8 may be employed. A distinctive feature of the given configuration is the recording module 105 configured to record images with various defocusing levels. The recording module 105 may include the detector 7 and the dispersive device 14. An image of the nanostructure formed by illuminating a light beam with a spectrum width Δλ by the lens 4 and the pipe lens 6 on the sample 5 is obtained by the detector 7. Thus, the dispersive device 14 selectively ensures deviation of the light beam from the optical axis by the wavelength. Therefore, the spatial spectral resolution is ensured by the detector 7 that captures a two-dimensional image. In the direction of the dispersion of the dispersion device 14, this is a spectral resolution, and in the orthogonal direction, this is a spatial resolution. FIG. 10A shows an example of a result of recording a set of images of a point radiation source with various defocusing levels generated while scanning the wavelength of a light source in the detailed embodiment of the optical measuring system shown in FIGS. 3, 5, and 7. FIG. 10B shows an example of a result of recording a set of images of a point radiation source with various defocusing levels generated in the embodiments of the optical measuring system based on the spatial spectral resolution shown in FIGS. 6 and 8. A defocusing level of the point radiation source (conditionally shown in the figure) is changed along a horizontal axis in a direction of the dispersive device 14. The defocusing level is equal to zero at λ=λ4 and reaches the peak at λ=λ1 and λ=λ7. A spatial distribution of intensity in a defocused image of the point radiation source varies on a vertical axis. In the above embodiment, all necessary defocused images are simultaneously recorded in the chosen conditions of illumination of the sample 5. The dispersive device 14 ensures a spatial separation of the defocused image by the detector 7, and a necessary defocusing level of each image is achieved according to a particular design of the defocusing module 10. Thus, neither the mechanical shifting of the sample 5 along the focus line nor adjusting of the wavelength of the radiation source is required. In the scheme of the measuring system having the spatial spectral resolution of the module of recording a set of images with various defocusing levels, the spectral resolution and uncertainty of a defocusing level of an object measured along the horizontal axis of the detector is generally determined by the size of the nanostructure in the direction of the dispersion of the device 14. This circumstance must be taken into consideration in modeling (simulation) the results of measuring and determination the critical size of the nanostructure.

The measurement results are modeled in the program module 108 for calculating a set of images with various defocusing levels according to the exemplary embodiment, which may be implemented by combining calculation methods of an electromagnetic field RCWA (Rigid Coherent Waves Analysis) (see M. G. Moharam, Drew A. Pommet, and Eric B. Grann, J. Opt. Soc. Am. A, 12(5):1077{1086}, May 1995) and FDTD (Finite Differences on Time Domain) (see K. Umashankar, A. Taflove, "A Novel Method to Analyze Electromagnetic Scattering of Complex Objects", IEEE, 1982), based on a correct solution of the Maxwell equations. The parameters of the optic scheme determining the illumination and recording conditions of the set of images having different defocusing levels depending on the wavelength, indicated above, and the change range of the CS from which data for calculation is selected are used in a permissible range of input parameters of the module. The change range of the CS of the nanostructure measured in the majority of practically important metrology problems in the semiconductor production is known with high accuracy, and a selection of an initial range for sequential calculation of defocused images is not difficult and may be performed by expert evaluations. The narrower and enhanced change range of the CS may be determined as a result of comparing the measurement sequence of defocused images with the calculation sequence.

The comparison module 107 is configured to compare the recorded and defocused images with the calculated images. The comparison module receives a set of recorded and defocused images of the nanostructure that is an examined object and several sets of pre-calculated and defocused images with respect to a certain range of the CS change. The best estimate value of the measured critical size measured as an output of the comparison module is determined as a result of comparison, and/or the narrower and precise change range of the CS value is defined. Several methods of comparing digital images applicable to the comparison module are known as the prior art. And, a result of comparison represents a number indicating how similar the measured sequence of images and the pre-calculated sequence from the library are. For the analysis of the sequences of images with various defocusing levels, the concept of "focus metric" (see Attota, R., Silver R. M., and Potzick, J., "Optical illumination and critical dimension analysis using the through-focus focus metric," Proc. SPIE, 6289, p. 62890Q-1-10, 2006) may be introduced. A specific parameter is input to each defocused image for conformity. These parameters depend on the object topology of a defocusing level. Such parameters may be represented, in particular, by a standard deviation computed on the basis of the digital image including a two-dimensional data array (file). A focus-metric curve may be generated by calculating the focus-metric for the nanostructure image at various levels of defocusing.

As the defocusing level and a wavelength of the scattered radiation are connected with each other by the method depending on the parameters of the optic scheme, specified above, recording and calculation of the focus-metric for a specific nanostructure depending on the wavelength are possible. The focus-metrics curves, depending on the wavelength, generated in processing a set of recorded and defocused images and the sets of pre-calculated and defocused images in the selected change range of the CS may be compared to one another. The best coincidence of curves indicates the best estimate for the measured value of the CS.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:
1. An optical measuring system for measuring a critical size of a nanostructure, the optical measuring system comprising:
   an illumination module configured to illuminate a sample with the nanostructure that is an examined object;
   an optical image generating module configured to generate an optical image of the nanostructure;
   a defocusing module configured to defocus the optical image;
   a calculation module configured to calculate a set of images with various defocusing levels;
   an adjusting and monitoring module configured to adjust and monitor parameters of an optic scheme and illumination conditions with respect to the set of images with various defocusing levels, and transmit, to the calculation module, the parameters of the optic scheme and the illumination conditions;

a recording module configured to record the set of images with various defocusing levels; and a comparison module configured to compare the recorded and defocused images with pre-calculated and defocused images.

2. The optical measuring system of claim 1, wherein a defocusing level A of the defocusing module depends on a wavelength and the defocusing module defocuses the optical image to comply with a condition $0<\Delta<5*\lambda/(NA)^2$, where $\lambda$ denotes an average wavelength of illuminating radiation and NA denotes a numerical aperture of a lens.

3. The optical measuring system of claim 1, wherein the illumination module comprises a light source with an adjustable wavelength, an optical illumination system, and a lens.

4. The optical measuring system of claim 3, wherein the adjustable wavelength of the light source is adjustable within a wavelength range of about 300 nm to about 800 nm.

5. The optical measuring system of claim 4, wherein the recording module comprises a detector and the light source with the adjustable wavelength, and is configured to continuously record defocused images of the nanostructure while adjusting the wavelength of the light source.

6. The optical measuring system of claim 4, wherein the recording module comprises a detector, a disperse device, and a wideband light source, and is configured to simultaneously record defocused images of the nanostructure by using spatial spectral resolution within the wavelength range of the light source.

7. The optical measuring system of claim 1, wherein the illumination module comprises a light source with a spectrum range of wavelengths of about 300 nm to about 800 nm, an illumination optical system, and a lens.

8. The optical measuring system of claim 1, wherein the optical image generating module comprises a microscope optical system.

9. The optical measuring system of claim 8, wherein the optical image generating module comprises a lens, a beam splitter, and a pipe lens.

10. The optical measuring system of claim 9, wherein a function of the defocusing module depending on a wavelength is performed by the pipe lens of the optical image generating module by using a chromatic aberration phenomenon.

11. The optical measuring system of claim 9, wherein a function of the defocusing module depending on a wavelength is performed by the lens of the optical image generating module by using the chromatic aberration phenomenon.

12. The optical measuring system of claim 1, wherein the defocusing module comprises two identical parallel diffraction gratings and a mirror, wherein the two diffraction gratings and the mirror allow setting an optical propagation difference depending on a wavelength.

13. The optical measuring system of claim 1, wherein the adjusting and monitoring module performs at least one of adjusting, measuring, and monitoring the parameters of the optic scheme and the illumination conditions.

14. A method of measuring a critical size, the method comprising:

selecting parameters of an optic scheme and an illumination condition;

recording a set of nanostructure images corresponding to various wavelengths with various defocusing levels of scattered radiation;

calculating a plurality of sets of images of a nanostructure with various defocusing levels, corresponding to various wavelengths of the scattered radiation with critical size (CS) values within a known range; and comparing a set of measured images of the nanostructure with the sets of the calculated images and determining a best approximate value of the CS values.

15. The method of claim 14, wherein at least one of the parameters of the optic scheme and the illumination condition is selected from the group consisting of a spatial frequency spectrum of illumination, a temporal illumination spectrum, a direction of a polarization vector, a numerical aperture of a lens, a defocusing level, a dependence of the defocusing level on the wavelength.

16. The method of claim 14, wherein the recording comprises sequentially recording defocused images of the nanostructure \while adjusting a wavelength of a light source.

17. The method of claim 14, wherein the recording comprises simultaneously recording defocused images of the nanostructure by using spatial spectral resolution within a wavelength range of a light source with a wideband spectrum.

18. The method of claim 14, wherein the determining the best approximate value of the CS values comprises determining the best approximate value of the CS values by calculating a library of images and comparing the set of the measured images of the nanostructure with corresponding sets of the calculated images from the library.

19. The method of claim 14, wherein the comparing the set of measured images of the nanostructure with the corresponding sets of the calculated images comprises calculating curves of a focus-metric depending on a wavelength when images generated at various wavelengths of the scattered radiation and having different levels of defocusing are identical to parameters depending on the defocusing level, the wavelength and a topology of the nanostructure.

20. The method of claim 14, wherein the comparing the set of measured images of the nanostructure with the corresponding sets of the calculated images comprises calculating curves of a focus-metric depending on a wavelength.

* * * * *